June 23, 1953     D. ENTWISTLE     2,643,207
BONDING OF TEXTILE YARNS TO RUBBER
Filed Oct. 13, 1947
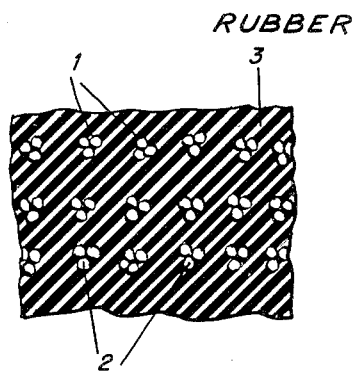
RAYON FILAMENTS WITH
A PERMANENTLY SOLUBLE,
PERMANENTLY FUSIBLE
ALDEHYDE DIHYDRIC PHENOL
CONDENSATE DISTRIBUTED
WITHIN THE FILAMENTARY
STRUCTURE.
Inventor
Donald Entwistle
By his attorneys
Howson and Howson Patented June 23, 1953

2,643,207

UNITED STATES PATENT OFFICE 2,643,207

BONDING OF TEXTILE YARNS TO RUBBER

Donald Entwistle, Coventry, England, assignor to Courtaulds Limited, London, England, a British company Application October 13, 1947, Serial No. 779,651
In Great Britain November 12, 1946

12 Claims. (Cl. 154—100)

This invention relates to the bonding of textile yarn to rubber, for example, the bonding of cotton or viscose rayon tyre cords to rubber in the production of automobile tyres.

Despite the greater strength of rayon cords in comparison with cotton cords as used in tyre production, rayon cords often cannot be used in simple substitution for the cotton cords owing to the lower degree of bonding obtained. To meet this difficulty many attempts have been made, with varying degrees of success, to employ certain specified adhesives to improve the bonding between rayon cord and rubber.

United States Patent Number 2,128,229 describes the treatment of tyre cords with aqueous solutions or dispersions of heat-hardening aldehyde resin-forming substances such as phenolic resins, examples being resorcinol-formaldehyde condensation products in which the molar ratios of resorcinol to formaldehyde are between 1:3 and 1:7.

It is the object of the present invention to improve the bonding of textile yarns to rubber with the aid of a particular form of resin.

According to the present invention a process for the production of a composite article comprising vulcanized rubber bonded to textile yarns includes the step of vulcanising rubber in contact with textile yarns with which has been incorporated a permanently fusible and alkali-soluble condensation product obtained by condensing an aldehyde and a phenol of the group of monohydric and dihydric phenols. For example, the textile yarns which may be cotton or rayon yarns or such yarns twisted into cords may be treated with the resinous condensation product, or the resinous product may be incorporated in the spinning solution prior to the extrusion of the rayon filaments.

The drawing is a cross sectional fragmentary view of a composite article made in accordance with the invention and comprising rubber bonded to rayon yarn in which is uniformly distributed a permanently soluble, permanently fusible phenol aldehyde condensation product.

The phenol for preparation of the permanently fusible and alkali-soluble resin may be a monohydric phenol such as phenol itself or a substituted phenol such as ortho cresol or the chlorphenols or may be a dihydric phenol such as catechol or resorcinol. The preferred phenol is resorcinol.

The permanently fusible and alkali-soluble resins for use in the present invention are generally obtained by condensing a phenol and an aldehyde in the molar ratio of 1: less than 1, the condensation being effected usually but not invariably in the presence of an acid catalyst. These products are technically known as Novolaks. It is known however that under certain conditions, for example, in the presence of a strong alkaline catalyst or with heterogeneous reaction conditions, heat-hardenable products may in fact result even though the phenol to aldehyde ratio is within the range of 1: less than 1; such heat-hardenable resins are not included in the present invention.

The cotton or formed rayon yarn may be treated with a solution of the resinous product and then dried so that a yarn is obtained which has a non-tacky coating of the resinous product available for improving to a material extent the bond between the tyre cord and the rubber. Conveniently the singles yarn is so treated before making up into cords. Alternatively, the resinous products to be used in accordance with the present invention may be added in the form of alkaline solutions to viscose prior to the spinning of viscose rayon fiilaments, for example, by mixing with a proportion of viscose and injecting the mixture into the main flow. In the case of rayon yarns, this latter method is preferred since the yarns having the resin uniformly dispersed therein are more conveniently handled in the manufacture of rubber articles than the coated rayon yarns.

The present invention also includes a composite article comprising vulcanised rubber bonded to textile yarns and as an adhesive between the rubber and the yarns a permanently fusible and alkali-soluble condensation product obtained from an aldehyde and a phenol of the group of monohydric and dihydric phenols.

The invention is particularly applicable to viscose rayon yarns but can be applied to other rayon yarns, for example, those of stretched and saponified cellulose acetate. It is also applicable to articles such as conveyor belting and V driving-belts. It is also applicable to tyres and similar articles made from synthetic as well as natural rubber products, such as for example, the synthetic rubbers obtained by polymerising butadiene with other polymerisable compounds such as styrene or acrylonitrile.

The process of the invention is of particular advantage in view of the high increase in the strength of the bond; another important advantage is that it enables the singles yarn to be treated before it is made into cords and also simplifies the handling of the yarn.

The invention is illustrated by the following specific examples:

Example 1

2600 grams of resorcinol (1 mol) and 1500 cubic centimetres of 35 per cent formaldehyde solution (.74 mol) were dissolved in 12 litres of water containing 30 grams of caustic soda and the solution was left for 48 hours at 20° centigrade for reaction between the resorcinol and formaldehyde to be completed. This reaction mixture was then added to 150 litres of water in which 0.1 per cent by weight of cetyl sodium sulphate was also present as lubricant and softening agent. The solution obtained was then used to treat 100 pounds of freshly spun and washed viscose rayon cakes, the cakes being completely immersed in the solution at 60° centigrade for half-an-hour. The cakes were then removed from the solution, hydro-extracted and dried and were then used for the construction of tyre cords.

A composite article according to the present invention is illustrated by way of example in the accompanying diagrammatic drawing which is an enlarged fragmentary section of a rubber article in which cords produced from filaments made as described in the above example are embedded. Referring to the drawing, cords 1 formed by twisting together three continuous-filament regenerated cellulose yarns 2, are embedded in rubber 3; in accordance with the invention, each filament of the yarn 2 forming the cords 1 has substantially uniformly distributed throughout its structure a permanently soluble, permanently fusible resin obtained by the condensation of an aldehyde and a dihydric phenol using a molar ratio of aldehyde to phenol of less than 1:1.

The adhesion to rubber of these cords was found to be equal to the adhesion of a similar untreated cotton cord and twice the adhesion of a cord prepared from untreated viscose rayon when tested as follows:

A number of 10 inch lengths of each type of cord are laid lengthwise on the surface of a slab of an unvulcanised rubber composition measuring 10 inches by 3 inches by ⅛ inch and gently pressed by hand into the rubber. The composition of the rubber stock is as follows, the parts being by weight:

Smoke sheets 100 parts, zinc oxide 40 parts, sulphur 3.5 parts, pine tar 1 part, stearic acid 2 parts, antioxidant (phenyl beta-naphthylamine) 1.5 parts and accelerator (mercaptobenzthiazole) 0.5 part.

The surface with the cords therein is now covered by a sheet of regenerated cellulose while the other surface is covered with a canvas sheet which is in turn covered by a sheet of regenerated cellulose. The whole assembly is now placed in a platen press and vulcanised at 30 lb. per square inch steam pressure for 60 minutes. The rubber slab is removed from the press and the sheets of regenerated cellulose stripped off giving a rubber slab having the cords buried therein with the upper surfaces flush with the surface of the rubber. The canvas backing serves to render the slab inextensible while carrying out the adhesion tests. One end of each cord is now stripped out for about one inch and pulled in a direction along the surface of the rubber, the cord being bent back through an angle of 180° during the test. The pull required to separate the rubber and the cord is determined.

Example 2

1400 grams of phenol, 1200 grams of 30 per cent formaldehyde solution, 2 litres of water and 50 cubic centimetres of 35 per cent aqueous hydrochloric acid were mixed and heated with stirring at 100° centigrade for 24 hours. The viscous resin layer was then separated and dissolved in 5 litres of 5 per cent aqueous caustic soda. This solution was incorporated in 1000 kilograms of viscose containing 7 per cent of cellulose and 8 per cent of caustic soda and the viscose was then spun into yarn by the process described in U. S. Patent No. 2,192,074 with the exception that the yarn was not subjected to an alkaline desulphurising treatment.

Adhesion tests with the yarn obtained were similar to those obtained in Example 1.

A similar result to that obtained in Example 1 is obtained if the yarn in the cakes is dried before treatment with the resin solution.

What I claim is:

1. A process for the production of a composite article comprising vulcanized rubber bonded to rayon yarns which includes the steps of distributing within the filamentary structure of rayon yarn an adhesive consisting essentially of a permanently soluble, permanently fusible resin obtained by the condensation of an aldehyde and a phenol selected from the group consisting of monohydric and dihydric phenols, said resin being obtained by condensing the aldehyde and the phenol in a molar ratio of less than 1:1, placing the yarns so formed in contact with unvulcanized rubber and subjecting the assembly to a vulcanizing temperature.

2. A process for the production of a composite article comprising vulcanized rubber bonded to viscose rayon yarns which includes the steps of dissolving a permanently soluble, permanently fusible resin obtained by the condensation of an aldehyde and a phenol selected from the group consisting of monohydric and dihydric phenols, said resin being obtained by condensing the aldehyde and the phenol in a molar ratio of less than 1:1, in a viscose solution in the absence of a hardening agent for the said resin and spinning a yarn, placing the resin-containing yarns so obtained in contact with unvulcanized rubber and subjecting the assembly to a vulcanizing temperature.

3. A process as claimed in claim 2 wherein a permanently soluble, permanently fusible resin obtained from an aldehyde and resorcinol is used.

4. A process for the production of a composite article comprising vulcanized rubber bonded to rayon yarns which includes the steps of treating rayon yarn with a solution of an adhesive consisting essentially of a permanently soluble, permanently fusible resin obtained by the condensation of an aldehyde and a phenol selected from the group consisting of monohydric and dihydric phenols, said resin being obtained by condensing the aldehyde and the phenol in a molar ratio of less than 1:1; drying the yarns so treated, placing the yarn in contact with unvulcanized rubber and subjecting the assembly to a vulcanizing temperature.

5. A process as claimed in claim 4 wherein a permanently soluble, permanently fusible resin obtained from an aldehyde and resorcinol is used.

6. A composite article comprising vulcanized rubber bonded to rayon filaments by means of an adhesive consisting essentially of a permanently soluble, permanently fusible resin obtained by the condensation of an aldehyde and a phenol selected from the group consisting of monohydric and dihydric phenols, said resin being obtained by condensing the aldehyde and the phenol in a molar ratio less than 1:1, in said filaments.

7. A composite article comprising vulcanized rubber and rayon filaments containing an adhesive consisting essentially of a permanently soluble, permanently fusible resin obtained by the condensation of an aldehyde and a phenol selected from the group consisting of monohydric and dihydric phenols, said resin being obtained by condensing the aldehyde and the phenol in a molar ratio less than 1:1, whereby said rubber is bonded to said rayon.

8. A composite article as claimed in claim 7 wherein the resin is obtained by the condensation of an aldehyde and resorcinol.

9. A process for the production of a composite article comprising vulcanized rubber bonded to rayon yarns which includes the steps of distributing within the filamentary structure of rayon yarn an adhesive consisting essentially of a permanently soluble, permanently fusible resin obtained by the condensation of an aldehyde and a dihydric phenol, said resin being obtained by condensing the aldehyde and the phenol in a molar ratio of less than 1:1, placing the yarns so formed in contact with unvulcanized rubber and subjecting the assembly to a vulcanizing temperature.

10. A process for the production of a composite article comprising vulcanized rubber bonded to rayon yarns which includes the steps of treating rayon yarn with a solution of an adhesive consisting essentially of a permanently soluble, permanently fusible resin obtained by the condensation of an aldehyde and a dihydric phenol, said resin being obtained by condensing the aldehyde and the phenol in a molar ratio of less than 1:1, drying the yarns so treated, placing the yarn in contact with unvulcanized rubber and subjecting the assembly to a vulcanizing temperature.

11. A composite article comprising vulcanized rubber bonded to rayon filaments by means of an adhesive consisting essentially of a permanently soluble, permanently fusible resin obtained by the condensation of an aldehyde and a dihydric phenol, said resin being obtained by condensing the aldehyde and the phenol in a molar ratio less than 1:1, in said filaments.

12. A composite article comprising vulcanized rubber and rayon filaments containing an adhesive consisting essentially of a permanently soluble, permanently fusible resin obtained by the condensation of an aldehyde and a dihydric phenol, said resin being obtained by condensing the aldehyde and the phenol in a molar ratio less than 1:1, whereby said rubber is bonded to said rayon.

DONALD ENTWISTLE.

References Cited in the file of this patent

UNITED STATES PATENTS

| Number | Name | Date |
| --- | --- | --- |
| 2,065,941 | Lane | Dec. 29, 1936 |
| 2,128,229 | Charch | Aug. 30, 1938 |
| 2,211,931 | Izard | Aug. 20, 1940 |
| 2,291,208 | Brown et al. | July 28, 1942 |
| 2,313,104 | Wallach | Mar. 9, 1943 |
| 2,322,981 | Ubbelohde | June 29, 1943 |
| 2,354,426 | Briant | July 25, 1944 |
| 2,385,374 | Rhodes | Sept. 25, 1945 |
| 2,397,627 | Smith | Apr. 2, 1946 |
| 2,398,001 | Haney | Apr. 9, 1946 |
| 2,425,349 | Schroeder | Aug. 12, 1947 |
| 2,449,180 | Schroeder | Sept. 14, 1948 |
| 2,458,886 | Weeldenburg | Jan. 11, 1949 |
| 2,468,530 | Weeldenburg | Apr. 26, 1949 |